United States Patent [19]

Reichenbach

[11] 3,950,119

[45] Apr. 13, 1976

[54] APPARATUS FOR MOLDING FLUID SEAL ELEMENTS

[75] Inventor: Jerry D. Reichenbach, Carpentersville, Ill.

[73] Assignee: Chicago Rawhide Manufacturing Company, Elgin, Ill.

[22] Filed: Jan. 14, 1974

[21] Appl. No.: 433,195

[52] U.S. Cl. ...... 425/251; 425/450.1; 425/DIG. 228
[51] Int. Cl.² ........................ B29G 1/00; B29G 3/00
[58] Field of Search .. 425/129, 251, 252, DIG. 228, 425/450 R, 809

[56] References Cited
UNITED STATES PATENTS

| 3,004,298 | 10/1961 | Haynie | 425/129 X |
| 3,212,131 | 10/1965 | Aichele | 425/809 X |
| 3,278,985 | 10/1966 | Everett | 425/809 |
| 3,315,316 | 4/1967 | Baney et al. | 425/DIG. 47 |
| 3,366,723 | 1/1968 | Green | 425/809 |
| 3,773,454 | 11/1973 | Horve et al. | 425/129 R X |
| 3,841,809 | 10/1974 | Tucker | 425/DIG. 47 |

Primary Examiner—Francis S. Husar
Assistant Examiner—Carl Rowold
Attorney, Agent, or Firm—James T. FitzGibbon

[57] ABSTRACT

An apparatus for molding articles, particularly those having a body portion formed from a cured material and bonded to a relatively rigid insert portion. Two mold members are arranged for relative movement along a given axis between open and closed positions. Each of the members includes surfaces at least partly directed towards each other to define in said closed position of the members, a molding cavity between the members. One of the mold members has a part for engaging a relatively rigid insert, so as to form a flash barrier on the insert when it is engaged by the mold part. The mold has surfaces for supporting the insert on at least one of its surfaces. The mold assembly includes a third mold member which is movable relative to both of the other two mold members. The moldable material from which the article is to be formed is received on one mold member, and the other member is reciprocable along a given axis and adapted to apply a predetermined closing force to the first and third members. Springs or other resilient means are disposed between a mold plate and the first mold member, and a second spring is disposed between the third mold member and the mold plate, and the first and third mold members have sealing surfaces engaging each other and separated only by a working clearance. In use, the members respectively first engage the stamping, then the rubber, and finally, under the spring force, move the rubber into the mold and hold it there under a predetermined force.

6 Claims, 5 Drawing Figures

APPARATUS FOR MOLDING FLUID SEAL ELEMENTS

BACKGROUND OF THE INVENTION

The present invention relates to manufacturing articles by molding them from fluent materials, and more particularly, to an apparatus and method which is particularly adapted to minimize or eliminate problems commonly occurring in the molding of rubber and other materials, and particularly in so-called insert molding.

One field wherein insert molding techniques are commonly employed is the oil seal field. Perhaps the most common type of oil and grease seal made today is one wherein a seal body is provided which has one or more sealing lips made from a natural or synthetic elastomer which is bonded to, or which surrounds or encloses at least a part of a stiff casing or other structural member.

Typically, oil seals made to act radially on a shaft comprise an exterior annular metal casing or cup of L-shaped or other suitable cross section, made by a simple stamping operation and having bonded to the inner periphery thereof an annular rubber body having one or more sealing lips thereon.

The casing, stamping or stiffener is used to achieve rigid mounting of the seal, and the elastomeric seal body is designed to provide fluid retention by engagement in fluid-tight relation of an associated shaft, and also to provide tolerance of eccentric motion, which to a greater or less degree, occurs in shafts of all kinds. The expression "insert molding" applies to a molding method wherein a metal or other stiff "insert" is disposed entirely within or projects partially into the cavity in which the seal body is formed by molding. The invention is useful in molding ordinary rubber or plastic parts as well as in insert molding.

Today, most fluid seals are made by so-called compression molding, by which is meant a method wherein a selected piece of rubber, appropriately compounded and shaped, is forced by the simple compressing or closing action of mold closure into a cavity which is completely defined only when the mold is fully closed.

A large number of seals are also made by so-called injection molding, wherein the mold is fully closed over the insert before any rubber enters the mold, and wherein rubber is thereafter injected through one or more small orifices or sprues into the cavity, usually by a screw-type injector.

A certain number of seals are also made by "transfer molding," a process combining certain features of both compression molding and injection molding.

In general, compression molding is desirable because of economy and relative simplicity, especially where large numbers of parts are to be made in multiple-cavity molds. This is because a single press may accommodate a large number of molding cavities, and accordingly, one "heat" or cycle of a molding press may produce 24, 36, 48 or other large number of parts, for example.

When the inherent economies of compression molding are most apt to be realized, however, certain problems invariably occur which create problems of quality control. This is especially true where the article in question, such as an oil seal, is finish molded to its exact size rather than being molded to an approximate size and later trimmed to its exact size.

Specifically, a very common problem with compression molding is securing precise filling of each individual mold cavity, together with insuring that the contents of each mold cavity are maintained under a suitably high pressure.

It will be understood that if a mold cavity is not completely filled, the article will not have the desired shape, and will be characterized by voids, pock marks, blisters, and a generally irregular shape. If sufficient pressure is not maintained in the mold, a porous finished product may result, because of the undesirable inclusion into the molded product of gases generated during curing of the rubber. On the other hand, if an excess of material is provided, mold closing forces will cause the rubber material, which is substantially incompressible when totally confined, to leak or "flash" from the mold cavity, usually along the insert. This flash is undesirable, because it must either be removed from the finished product by a separate operation, or left on the finished product, which is also undesirable for functional or esthetic reasons, or otherwise.

Inasmuch as the size of the individual piece or rubber from which the molded part is made, sometimes referred to as the "prep," is not easy to control accurately within precise limits, especially without undue expense, most compression molded parts are either characterized by certain amount of flash, or the molders have resigned themselves to eliminating flash by performing operations subsequent to molding.

Certain attempts have been made to overcome these problems, and some of these proposals have been successful, at least in certain respects, to a greater or less degree. However, one of the most common methods involves actually reforming the stamping in the mold after the stamping has been produced, with resultant wear and shock on the mold. Moreover, where the seal body is joined to a flange of the stamping which is offset, the lip design must be relatively reduced in axial extent, which provides a seal of reduced flexibility, and which presents other disadvantages.

In view of the foregoing and other characteristics of prior art molds and methods, particularly those used for insert molding, as in the seal making art, it is an object of the present invention to provide an improved apparatus and methods for use in molding.

Another object is to provide an apparatus which is particularly adapted to retain the advantages of compression molding without possessing certain of the disadvantages usually associated therewith.

Another object of the invention is to provide an apparatus adapted to simplify compression molding and to improve the quality of the products made thereby.

Yet another object is to provide an apparatus capable of producing satisfactory parts even where there is a significant variation in the amount of raw material supplied for molding in the cavity.

A still further object is to provide an apparatus which will apply a predetermined force to fluent material during flow and curing thereof, but which will not exceed such force, even when the mold is fully closed.

Another object is the provision of a mold operable by a single press or platen but which is characterized by double-acting or sequential operation.

Another object is to provide a mold which makes possible accurate molding of parts, including insert molding, in a multi-cavity operation, even where there is a variation in the weight or volume of raw material pieces supplied to the mold.

Another object is the provision of an insert molding apparatus which includes means for positioning and holding the insert prior to molding, means for establishing a flash barrier along a part of the insert, means for defining at least a part of the cavity, and means movable relative to the means establishing a flash barrier for moving the molding material from an initial position spaced apart from the molding cavity through a transfer or tear trim area and into the molding cavity.

A still further object is to provide an apparatus having a stationary mold part or member partially defining a molding cavity and two additional mold parts, both of which are movable relative to the fixed part and to each other, and adapted for sequential operation.

Another object is the provision of a mold having relatively movable parts, with such mold including means for forcibly but resiliently urging such parts into a predetermined position for defining a molding cavity and insuring complete filling thereof by fluent moldable material without creating flash or other leakage and also having means for accommodating material in excess of that used to mold the part or article in question.

A still further object is to provide a method of compression molding which includes positioning and holding an insert in a desired position, establishing one or more flash barriers and establishing the contours of the molding cavity, thereafter filling such cavity with fluent, moldable material, and thereafter maintaining a predetermined force on said material during at least a portion of the curing time of the material, all of such steps occurring in sequence within the mold assembly upon application thereto of a single force supplied by a press or the like.

Another object is to provide a mold apparatus having a fixed mold core portion with surfaces thereon defining a part of a molding cavity, a second mold part movable relative to the first and having closing spring means associated therewith, a third mold part movable relative to the first and second mold parts and also having a closing spring associated therewith, and means for engaging both of said springs for moving said second and third mold parts along a common axis to a closed position in a predetermined sequence.

Still another object is to provide a mold apparatus of the type referred to herein which includes means for separating the excess or scrap material from the part as the mold is opened to remove the finished part therefrom.

Another object is to provide a mold of this type which further includes a resiliently operated hold-down device for positioning inserts or the like.

The foregoing and other objects are achieved in practice by providing a mold apparatus having a first, fixed mold member and second and third mold members movable along a given axis relative to the first member and relative to each other, resilient means associated with each of the second and third parts, with the resilient means being adapted to be engaged by one or more parts for effecting a movement sequence so as to define a molding cavity between the first and second members and subsequently fill the cavity by applying a limited force to the third member to move molding material from the area in which it is received to the mold cavity.

The manner in which the foregoing and other objects and advantages of the invention are achieved in practice will be more clearly apparent when reference is made to the detailed description of certain preferred embodiments of the invention set forth by way of example, and illustrated in the accompanying drawings, in which like reference characters indicated corresponding parts throughout.

DESCRIPTION OF THE PREFERRED EMBODIMENTS OF THE INVENTION

Although it will be appreciated that the apparatus is capable of use in a number of different positions and orientations, in the embodiment described, and in the claims, reference may be made to the movements, flow, or other concepts based on the assumption that the mold parts move vertically, and that the elastomer or other material is forced downwardly into a molding cavity as movement of the mold parts occurs vertically in a desired direction.

Figure 1:
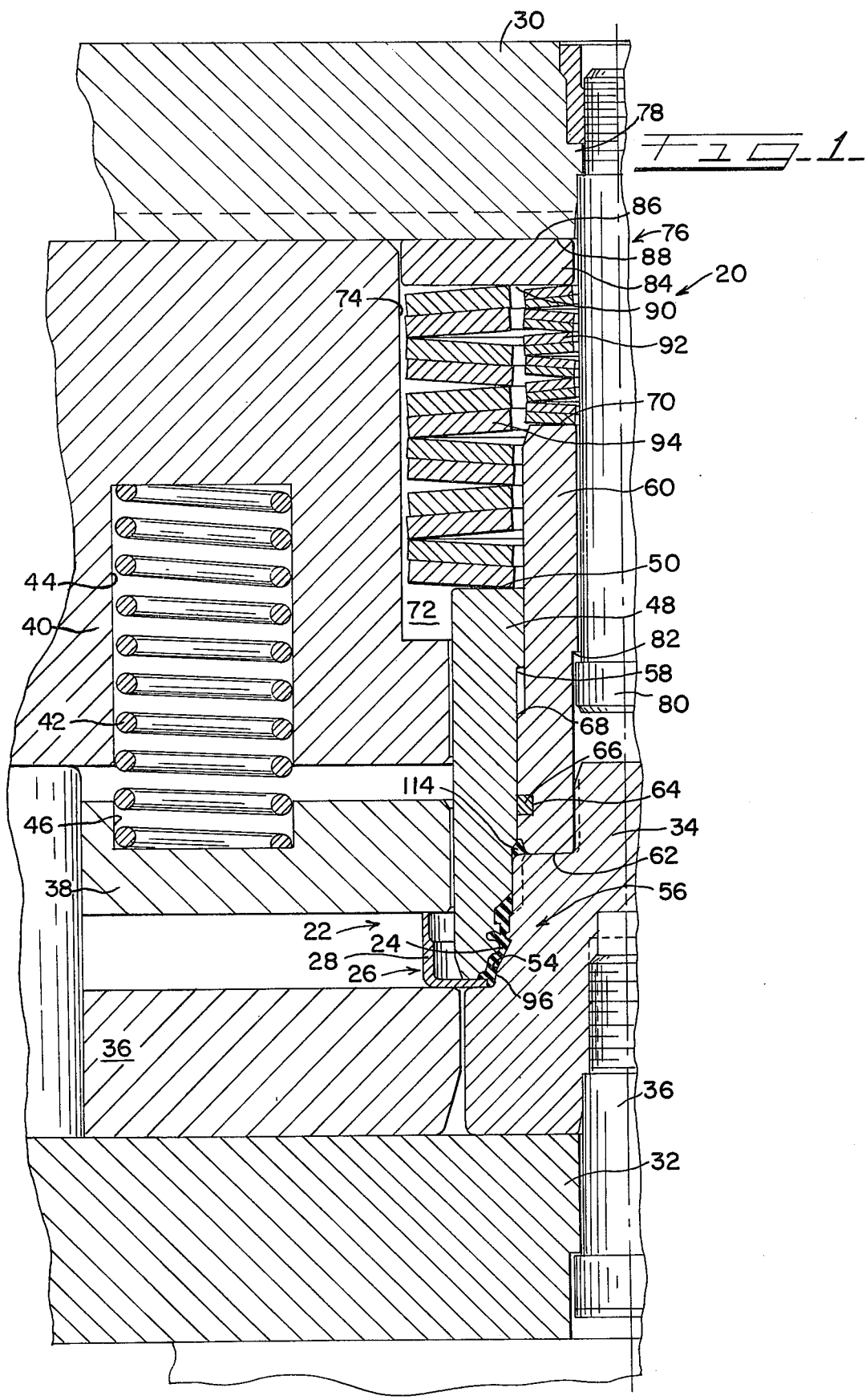
FIG. 1 is a vertical sectional view, with portions broken away, showing one form of molding apparatus made according to the invention and showing the mold members in the closed positions thereof with an insert disposed partially within the molding cavity and bonded to the moldable material filling the cavity.
Figure 2:
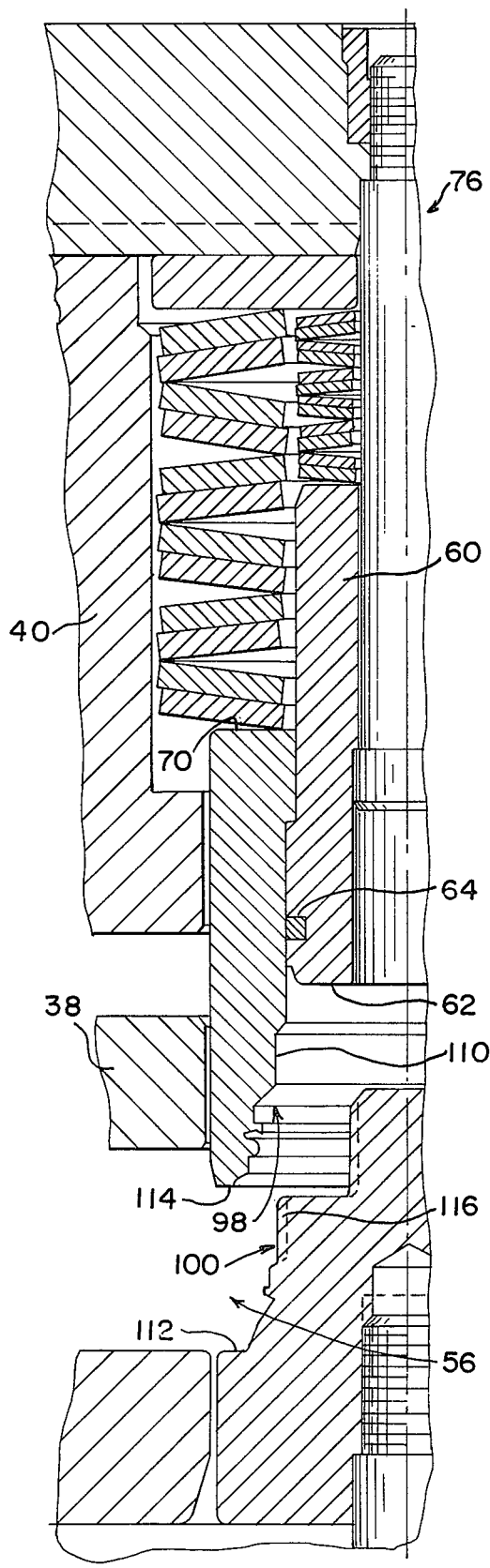
FIG. 2 is a fragmentary sectional view of the mold of FIG. 1 in a fully opened position.
Figure 3:
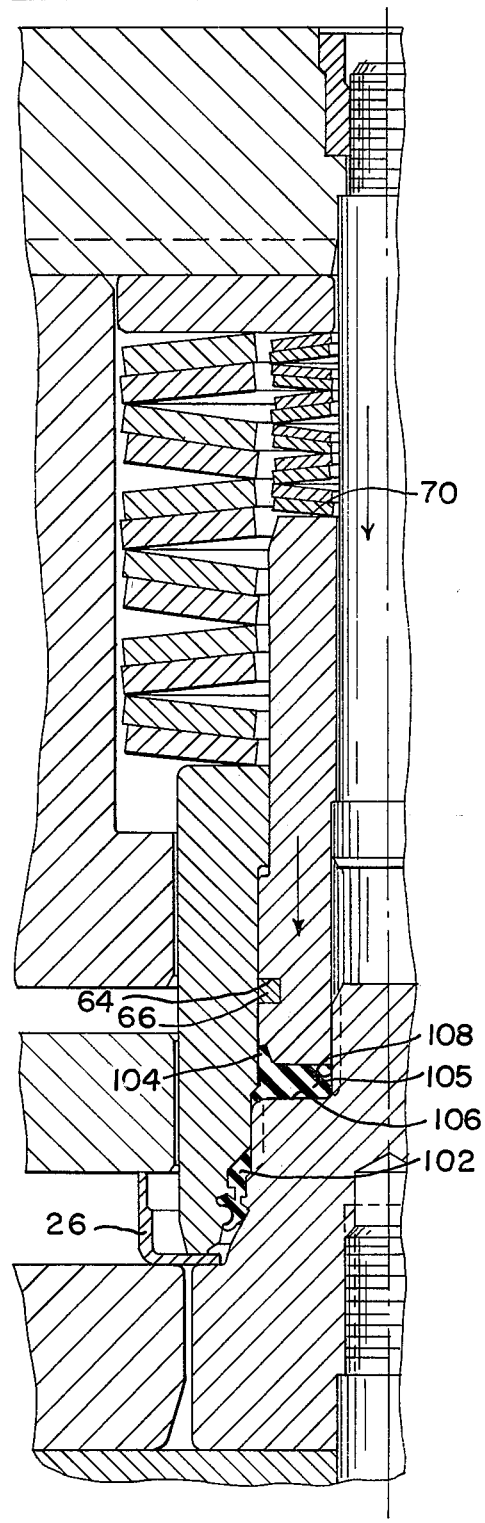
FIG. 3 shows the mold apparatus of FIGS. 1 and 2 with two of the mold members thereof in the closed position and showing the third element moving toward a closed position.

Referring now to the drawings in greater detail, FIGS. 1–3 show the invention to be typically embodied in a mold assembly generally designated 20, which is adapted for use in producing a seal assembly shown generally at 22 and having rubber or other generally resilient body portion 24 bonded to an insert generally identified as 26 and shown in the form of a flanged annular casing 28.

The principal portions of the molding apparatus itself include a top plate 30, a lower plate 32, a center core 34, secured as by fastener 36 to the lower plate 32, a stripper plate 36 resting on the bottom plate 32, and an insert hold-down ring 38 disposed beneath an upper hold-down unit 40, with these parts being biased apart by resilient means in the form of a coil spring 42 received in an upper cylindrical bore 44 in the upper unit 40 and extending into a lower recess 46 in the hold-down ring 38 and disposed in a position of axial registry with the bore 44 in the upper hold-down unit 40.

Disposed radially inwardly of the upper hold-down unit 40 is a cylindrical die or mold member 48 having a top surface 50, a bottom end portion 52, and generally radially inwardly directed surfaces 54 (FIGS. 2 and 3) which at least partially define a molding cavity generally identified as 56 (FIG. 3) and described in detail elsewhere herein. A downwardly facing, annular shoulder 58 is disposed on the upper portion of the die member 48. Located radially just inwardly of the die member 48 is another mold or die member in the form of an inner plunger 60 having an annular, radially extending, axially facing surface 62 forming the lower part thereof. Disposed within an annular groove 64 of rectangular cross-section is a stiff but lubricous seal ring 66, above which is disposed an annular, radially extending shoulder 68 in oppositely facing relation to the shoulder 58 of the die member 48. An annular surface 70 forms the top of the mold member or plunger 60.

As shown in FIG. 1, a cylindrical opening 72 is defined on its outside by an inner wall 74 of the upper hold-down unit 40, and on its inside by the outer surfaces of a fastener generally designated 76 having one end secured, as by a threaded connection 78, to the top plate 30. The fastener 76 also includes a head portion 80 spaced axially apart from a shoulder 82 extending radially inwardly on the inner surface of the plunger 60.

A collar unit 84 is disposed in the upper portion of the recess 72, with the upper surface 86 thereof engaging the lower surface 88 of the top plate 30, while the lower surface 90 of the collar 84 engages the upper ends respectively of an inner stack 92 and an outer stack 94 of resilient springs in the form of Bellville washers, that is, an array of axially compressible, frusto-conical dished washer elements arranged in series-parallel relation. A plurality of generally outwardly facing surfaces 96 are formed in the center core 34 and cooperate with the surfaces 54 on the lower end 52 of the die member 48 to define the molding cavity 56.

In addition, inwardly facing surfaces 98 are disposed on a portion of the die member 48 just above the surfaces 54 and cooperate with oppositely directed surfaces 100 located on the lower core 34 to define a transfer area or passage 102 between mold members 48, 34. This area of passage 102, which is best seen in FIG. 3, in addition to serving the purpose of providing a passage for the fluent material, also includes at least one shoulder on the movable mold part defining an area of reduced cross section to facilitate tearing or trimming the scrap so as to separate it from the finished article in a predetermined region.

A cylindrical, solid pin or "rest button" 39 rests on plate 32, and extends through the stripper plate 36 and the hold-down 38. Its upper surface engages the hold-down 40. The button 39 establishes a solid height for the mold and transmits force between plates 30 and 32 when the mold is closed.

Above the passage 102 is an area or chamber 104 which receives the "prep" 105 or mass of uncured elastomer or other material from which the finished article will be made. The chamber or area in which the prep is received is defined in part by a shoulder 106 on the mold core 34, by an axial wall 108 on the core 34, by an inner surface 110 (FIG. 2) of the member 48, and by the axial end face surface 62 on the lower portion of the plunger or inner die member 60.

Referring now to the operation of the form of apparatus shown in FIGS. 1–3, it will be assumed that it is intended to make a seal or other insert molded article such as the seal 22 shown in FIG. 1. After the assembly 20 has been opened and the part previously made has been removed therefrom, the assembly is in the position of FIG. 2, that is, the upper plate 30 is in a raised position, the collar 84 rests atop the two stacks of springs 92, 94, but is spaced axially apart from or lies outside the cylindrical opening 72. The outer or first mold member 48 is supported by the inner member 60 by reason of engagement between the shoulders 58, 68 on the outer and inner mold members 48, 60 respectively. Because the members 48, 60 are cylindrical, and are formed as shown, they are able to move relative to one another along a movement axis which is shown to be vertical.

Referring again to FIG. 2, it will be noted that the upper hold-down unit 40 is spaced considerably apart from the hold-down plate 38, and that the fastener 76 supports the die member 60 which in turn supports member 48 in such a manner that a pre-load may be placed on one or both of the spring stacks 92, 94.

Assuming now that a part is about to be formed, a stamping 26 is placed on a surface of the stripper plate 36, with the inner margin of the stamping 26 lying on a shoulder 112 which forms a part of the center core 34.

Next, the entire assembly shown as the upper part or half of FIG. 2 is moved downwardly along the common center line axis of the fastener 76 and the remainder of the parts. First, the lower surface of the hold-down ring 38 engages the rear or uppermost edge of the stamping 26, serving to hold it in position. The next increments of movement compress the hold-down spring 44, and thus increase to hold-down force, while continued downward movement of the upper half of the mold assembly 20 causes the lower or leading edge 114 of the mold member 48 to engage the back or upwardly facing surface of the radial flange of the casing 26 adjacent its inner margin. Force to move the member 48 is supplied from the plate 30 through the springs 44. At this point, the lower surface 62 of the inner die member or plunger 60 begins to engage the prep 105, which is customarily of a self-supporting consistency when inserted in the mold but which becomes fluent during mold closing by reason of absorbing heat from the surfaces defining the cavity 104.

Continued downward movement of the upper plate 30 acts through the inner spring stack 92 to urge the plunger further axially, that is, downwardly as shown in FIG. 3. This force combined with absorption of heat causes the prep 105 to become sufficiently fluent to move through the passage 102 defined by the surfaces 98, 100 and into the molding cavity 56. As shown in FIG. 1, the cavity 56 and the tear trim area 102 are fully filled with rubber, and a certain residual amount of rubber 114 remains in the cavity 104.

Compression of the outer stack of springs 94 urges the outer die member 48 downwardly onto the stamping margin with sufficient force to prevent flash from forming along the surfaces of the stamping or other seal insert. In other words, the springs 94 exert sufficient force in the closed position of the mold that flash is not formed and leakage is avoided. Because the inner plunger or die member 60 is also urged into the lowermost position by resilient means in the form of the stack of springs 92, it will tend to reach an equilibrium position such that the mold cavity 56 will be filled fully under the desired pressure, but the pressure will not rise to a level which will cause flash. Likewise, the pressure will not be so low that the cavity will not be filled nor so low that bubbles or other inclusions will be created in the product. With these criteria in mind, the proper spring forces may be determined by those skilled in the art. Ultimate force applied to members 48, 60 is limited by the springs and by the rest button 39.

The seal ring 64, which is preferably made out of a relatively stiff material such as "Teflon," (a polytetrafluoroethylene) prevents escape of flash between the two movable members 48, 60.

After elapse of a desired time, the rubber or other material in the cavity has cured to an extent sufficient to permit the mold to open. Opening the mold from the position of FIG. 1 to the position of FIG. 2 tears the rubber along the reduced cross-sectional area lying between the molding cavity 56 and the passage 102, thereby effecting a so-called tear trim between the rubber scrap and the finished part in a manner known to those skilled in the art.

The dotted lines 116 shown forming a part of the passage or area 102 illustrate that a plurality of notches or cutouts may be provided around the circumference of the inner core 34, if desired, to improve the flow patterns of the fluent rubber as described in U.S. Pat. No. 3,773,454.

Figure 4:
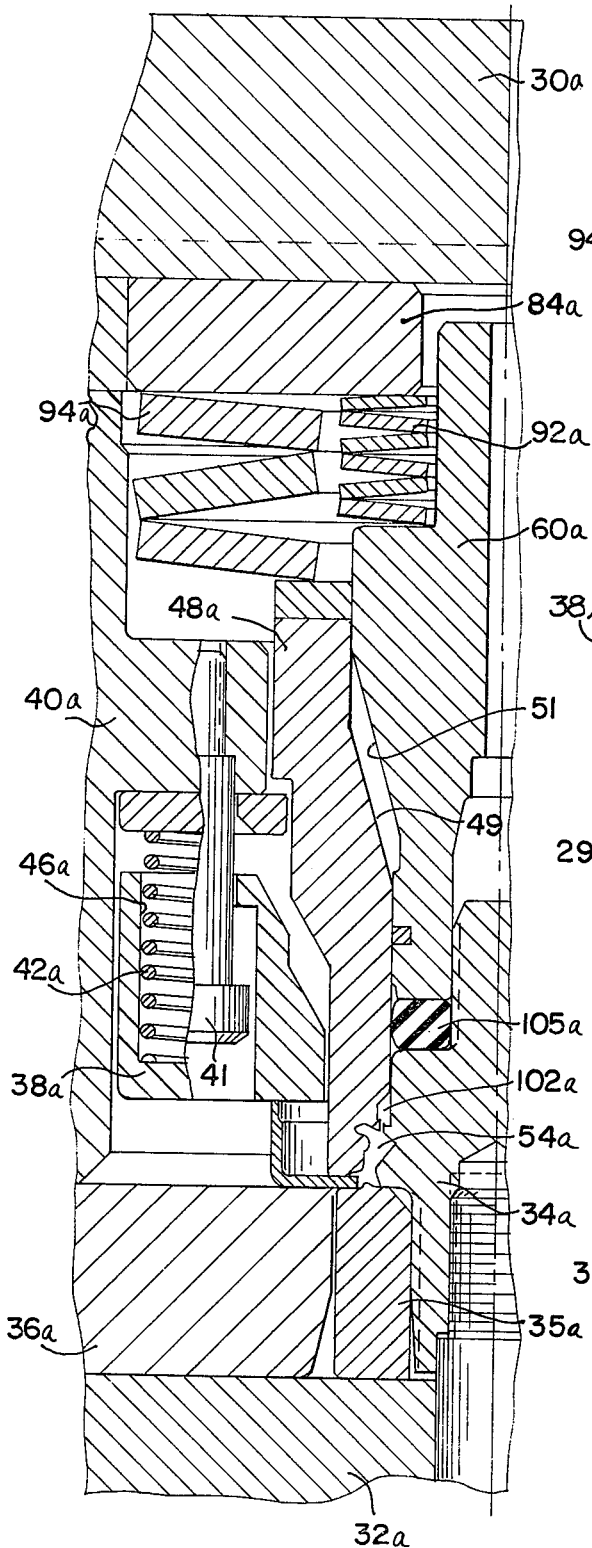
FIG. 4 shows another form of molding apparatus made according to the invention, with the elements being in a position such as that shown in FIG. 3.

Referring now to FIG. 4, a modified form of the invention is shown which is similar in its essential respects to the embodiment shown in FIGS. 1–3, but which differs therefrom in detail. Thus, FIG. 4 shows a top plate 30a, a collar 84a disposed therebeneath and acting upon the inner and outer stacks of springs 92a, 94a, with the inner stack 92a urging the inner mold member 60a downwardly and the outer stack 94a also urging the outer die member 48a downwardly.

The locations of the prep 105a, the transfer area 102a and the molding cavity 54a correspond to the locations of their counterparts in FIGS. 1–3. The insert hold-down of FIG. 4 is somewhat different in shape from its counterpart, but it includes the spring 42a, the lower hold-down 38a, the cavity 46a, and provides for engagement between the spring 42a and a portion of the upper hold-down 40a with which it is associated. A fastener 41 is provided to limit the downward motion of the lower hold-down 38a under the force of the spring 42a.

The embodiment of FIG. 4 also includes an inner core 34a which resembles its counterpart of FIGS. 1–3 and the stripper plate 36a and lower plate 32a. The principal respect in which the constructions differ is that relative movement between the outer and inner, axially movable mold members 48a and 60a is accomplished by registration of surfaces 49, 51, which are frusto-conical in shape and which face each other. In the closed position of the mold, downward movement of the member 60a is limited by reason of engagement between the tapered surfaces 49 and 51. The embodiment shown in FIG. 4 functions in essentially the same manner as the embodiment shown in FIGS. 1–3.

Figure 5:
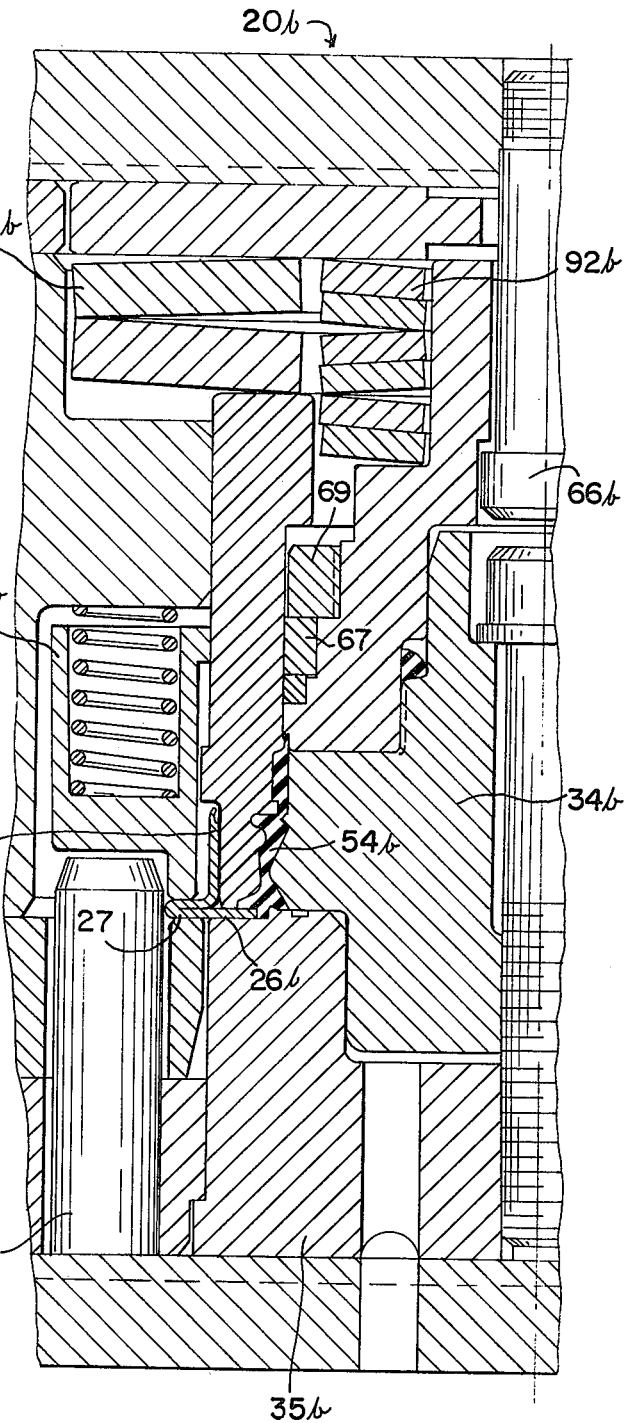
FIG. 5 is a fragmentary sectional view of a still further form of molding apparatus, showing the apparatus in a fully closed position.

Referring now to FIG. 5, another embodiment of the invention is shown which is similar to the embodiments of FIGS. 1–3 and FIG. 4; however, this embodiment also differs somewhat from the others in the respects referred to below.

The mold assembly 20b of FIG. 5 includes a molding cavity 54a defined by surfaces on the first or outer mold part 48b and the counterpart surfaces on the center core 34b. By contrasting FIGS. 4 and 5 with FIGS. 1–3, it will be seen that the molding cavities 54a, 54b, respectively, are defined by three members, with the third member being the core insert 35a (FIG. 4) or 35b (FIG. 5). Moreover, it will be seen in all the embodiments wherein the insert lies partially within the mold cavity and partially outside of it, that the cavity is also defined in part by the insert. For purposes of the invention, these points are immaterial; however, this fact is recited merely to point out that it is not essential that the cavity be defined by two members, only that it be defined b at least two members which move relative to each other to open and close the mold.

Referring again to FIG. 5, the hold-down arrangement is similar to that shown in FIG. 4, and the spring stacks 92b, 94b resemble those of the other embodiments. In FIG. 5, however, the seal shown being formed includes a stamping 26b of the so-called "shotgun casing" type, that is, the insert includes a double thickness radial flange 27 which lies radially outside of the axial flange 29 of the stamping 26b. Dowel pins 31 are shown to provide a casing centering function, that is, their inner edges engage the outer edge of the flange 27 and center the casing with respect to the core 34b.

FIG. 5 also shows that the seal ring 66b of Teflon or like material is engaged on one surface thereof by a collar 67, which is urged axially by a threaded sleeve or cap 69. As disclosed in U.S. Pat. application Ser. No. 287,228 filed Sept. 8, 1972, now U.S. Pat. No. 3,841,809 the threaded member 69 may be periodically tightened to cause the collar 67 confining the ring 66b to maintain tight engagement between the ring 66b and the inner surface of part 48b with which it forms a seal. This feature permits compensation to be made for the cold flow characteristics of the Teflon seal ring 66b, and insures the maintenance of the tight seal between these sliding parts which is necessary to prevention of flash and which permits buildup of the requisite molding pressures.

It will thus be seen that the present invention provides a molding apparatus and method having a number of novel advantages and characteristics, including those pointed out herein and others which are inherent in the invention. Representative embodiments of the invention only having been described in detail and merely by way of example, it is contemplated that a number of variations and changes will be apparent to those skilled in the art, and such changes may be made without departing from the spirit of the invention or the scope of the appended claims.

I claim:

1. An apparatus for molding articles having a body portion formed from a cured material and bonded to a relatively rigid insert portion, said apparatus comprising, in combination, first and second mold members arranged for relative movement along a given axis between open and closed positions of said members, each of said members including surfaces at least partly directed towards each other to define therebetween, in said closed position of said members, a molding cavity predetermining the exact shape of the body of said article to be formed, means on said first member for engaging a relatively rigid insert, said engaging means being adapted to form a flash barrier on said insert upon engagement thereof, means on said second member for supporting said insert along at least one surface thereof, a material pressing member movable relative to both said first and second mold members, means on said second mold member for receiving a prepared portion of moldable material from which said article is to be formed, means reciprocable along said given axis for applying a predetermined closing force to said first mold member and said press member, first resilient means disposed between said force applying means and said first mold member, second resilient means disposed between said press member and said force applying means, said first, second mold members and said press member confining said portion of moldable material, said members having mutual sealing surfaces separated from each other by a working clearance, said first and second resilient means having uncompressed, free height positions such that movement of said force applying means causes said first mold member to move from said open position to said closed position, thereby to define said molding cavity between said first and second mold member and said insert, and whereby subsequent movement of said press member causes said press member to engage said material and causes only that material able to be accommodated by said cavity to flow from the area of said material-receiving means into said molding cavity under the force applied by said press member through said second resilient means, the shape of said body portion thereby being determined solely by the predetermined shape of said cavity and not by the amount of moldable material in said portion thereof, the resiliency of said second resilient means limiting the force able to be applied to said material.

2. Apparatus as defined in claim 1 wherein said first mold member and said press member include portions adapted for mutual engagement to limit the amount of relative movement therebetween.

3. Apparatus as defined in claim 1 which includes means adapted to engage a portion of said insert to hold said insert in a desired position of registry within said mold prior to engagement of said insert by said second mold member.

4. An apparatus as defined in claim 1 wherein said first mold member and said press member each includes a cylindrical portion, with the outer surface of said cylindrical portion on said press member slidingly engaging the inner surface of said cylindrical portion of said first member.

5. A compression molding apparatus adapted to form articles from a moldable material that are bonded to a relatively rigid insert, said apparatus comprising a first, stationary mold member having surfaces thereon defining respectively, a portion of a molding cavity, a transfer area, and a material-receiving area, a second mold member movable relative to said first mold member between an open position and a closed position, said second member having surfaces thereon cooperating with said surfaces on said first member to define at least a portion of said molding cavity and a portion of said transfer area, said first and second members in the closed positions thereof combining with said insert to define the shape of said article, means for moving said second member between opened and closed positions along a given axis, first spring means disposed between said moving means and said second mold member, a material pressing member movable along said axis between open and closed positions, second spring means associated with said press member and disposed between said moving means and said press member, said press member having at least one surface adapted, in the movement along said axis between said open and closed positions, to engage a portion of said moldable material disposed in said material-receiving area and to move a portion of said material through said transfer area and into said molding cavity under the force supplied to said press member by said moving means through said second spring means to fill said cavity fully and to leave moldable material not able to be accommodated within said molding cavity outside of said cavity.

6. An apparatus as defined in claim 5 wherein said first and second mold members each includes oppositely directed surfaces adapted to engage an insert disposed therebetween in the closed position of said second mold member to establish flash barriers on said insert and prevent loss of said material from said molding cavity upon application of said mold closing force.

* * * * *